(12) United States Patent
Radke et al.

(10) Patent No.: US 6,791,555 B1
(45) Date of Patent: Sep. 14, 2004

(54) APPARATUS AND METHOD FOR DISTRIBUTED MEMORY CONTROL IN A GRAPHICS PROCESSING SYSTEM

(75) Inventors: William Radke, San Francisco, CA (US); James R. Peterson, Portland, OR (US)

(73) Assignee: Micron Technology, Inc., Boise, ID (US)

( * ) Notice: Subject to any disclaimer, the term of this patent is extended or adjusted under 35 U.S.C. 154(b) by 538 days.

(21) Appl. No.: 09/603,158

(22) Filed: Jun. 23, 2000

(51) Int. Cl.[7] .................................................. G09G 5/39
(52) U.S. Cl. ...................... 345/532; 345/531; 345/537; 345/565
(58) Field of Search ................................. 345/531, 544, 345/422, 532, 565, 537, 538; 711/170–173, 202, 22–24

(56) References Cited

U.S. PATENT DOCUMENTS 4,507,730 A  *  3/1985  Johnson et al.
5,357,621 A  * 10/1994  Cox
6,252,512 B1 *  6/2001  Jaddeloh

* cited by examiner

*Primary Examiner*—Kee M. Tung
*Assistant Examiner*—Hau Nguyen
(74) *Attorney, Agent, or Firm*—Dorsey & Whitney LLP

(57) ABSTRACT

A distributed memory controller memory system for a graphics processing system having addressable memory areas each coupled to a respective memory controller. The memory controllers are further coupled to each other through a memory controller bus upon which a memory access request and data may be passed from one memory controller to other memory controller. A memory access request to a memory location in one addressable memory area, but received by a memory controller coupled to another addressable memory area, is passed through the memory controller bus from the receiving memory controller to the memory controller coupled to the addressable memory area in which the requested location is located in order to service the memory access request. Additional memory controllers coupled to a respective addressable memory area may be included in the memory system. The memory controllers are coupled to the memory controller bus in order to receive and pass memory access requests from the other memory controllers.

52 Claims, 5 Drawing Sheets

APPARATUS AND METHOD FOR
DISTRIBUTED MEMORY CONTROL IN A
GRAPHICS PROCESSING SYSTEM

TECHNICAL FIELD

The present invention is related generally to the field of computer graphics, and more particularly, to a memory system for use in a computer graphics processing system.

BACKGROUND OF THE INVENTION

A heterogeneous memory system is a memory system where several different memories, or levels of memory, are used to satisfy memory demands of an computer application. An example of an application for a heterogeneous memory system is in graphics processing systems. Different levels of memory are used by a graphics processing system to facilitate graphics processing and rendering of graphics images on a display. A first level of memory is typically embedded memory that is fabricated directly on the same semiconductor substrate as a graphics processor. Embedded memory can provide data to the graphics processor at very low access times, and consequently, increase the speed at which graphics data may be processed. A second level of memory is typically memory that is external to the device, but located on the same graphics card as the graphics processor. Memory such as this is commonly referred to as external, or local memory. A third level of memory is AGP memory, or host memory that the graphics processor can access through a system bus. Host memory generally has the greatest access time of the three levels of memories because the graphics processor can only access the AGP memory via a system bus and several different memory and bus controllers. Although local memory can provide data more quickly than the host memory, it still is considerably slower than the embedded memory of the first level of memory.

For a conventional heterogeneous memory system, there are two typical arrangements. A first example of a heterogeneous memory system is arranged with a single memory controller to handle all memory accesses. Such an arrangement is illustrated in FIG. 1. The memory system 10 includes a central memory controller 12 coupled to both memory 20 through memory bus 16, and memory 22 through memory bus 18. The memory 20 may be representative of embedded memory, and the memory 22 may be representative of external memory. In operation, the central memory controller 12 receives memory access requests from various requesting entities, such as a graphics processor, over buses 14a–n. The central memory controller 12 services the various memory access requests by determining whether the requested memory address is located in the memory 20 or the memory 22. The appropriate memory device is accessed and data is written to or read therefrom. An arrangement such as memory system 10 has the advantage that additional memory may be easily added because all memory access requests are serviced by the central memory controller 12. For the same reason, the various memory access requests can all be handled seamlessly by the central memory controller 12. That is, when a memory access request is made, only the central memory controller 12 must determine which memory, either memory 20 or memory 22, to access. However, a problem with the arrangement of memory system 10 is that there are physical limitations as to the number of buses 14a–n that may be routed to the memory controller 12. Additionally, as the complexity of the central memory controller 12 increases to accommodate a greater number of memory access requests, the amount of space the central memory controller occupies also increases. Thus, space overhead issues become a concern in applications where small graphics processing systems are desired.

A second example of a heterogeneous memory system is shown in FIG. 2. Memory system 30 addresses some of the concerns raised by the memory system 10 of FIG. 1. The memory system 30 includes a central memory controller 12 coupled to a memory 20 through a memory bus 16. The central memory controller 12 services only the memory access requests made to memory 20. The memory system 30 also includes memory 22 directly coupled to a requesting entity through memory bus 32. Thus, memory access requests to memory 22 may be only made over the memory bus 32. The memory 20 may represent embedded memory, while the memory 22 may represent local memory. As illustrated in FIG. 2, all memory access requests to memory 20 are controlled by the central memory controller 12. However, access to the memory 22, is controlled directly by the requesting entity coupled to the bus 32. That is, access to memory 22 can be made only by the requesting entity hardwired to the bus 32.

The memory system 30 does, to some degree, resolve the issues with regards to the physical limitations of routing a plurality of request lines to a single central memory controller, as well as space overhead issues resulting from the complexity of using a central memory controller. However, a problem with the memory system 30 is that the allocation of available memory is fixed according to the design of the circuitry. That is, the memory 22 may be accessed only by the requesting entity to which it is coupled through bus 32. Any available memory in the memory 22 cannot be reallocated for another purpose, such as storing overflow data from the memory 20. Furthermore, memory access requests must be delegated prior to being made either to the central memory controller 12 or the memory 22, rather than having all memory access requests simply handled by a single central memory controller. Moreover, adding additional memory to the memory system 30 is made more difficult by the fixed arrangement. Additional memory cannot simply be reallocated, but must be added to supplement either memory 20 or memory 22, but not both.

Therefore, there is a need for a memory system where the number of memory access request lines to a memory controller is reduced and where the available memory may be allocated efficiently.

SUMMARY OF THE INVENTION

The present invention relates to a distributed memory controller memory system for a graphics processing system having addressable memory areas, each of which is coupled to a respective memory controller. Each memory controller accesses the addressable memory area to which it is coupled. The memory controllers are further coupled to each other through a memory controller bus upon which a memory access request and data may be passed from one memory controller to other memory controller. A memory access request to a memory location in one addressable memory area, but received by a memory controller coupled to another addressable memory area, is passed through the memory controller bus from the receiving memory controller to the memory controller coupled to the addressable memory area in which the requested location is located in order to service the memory access request. Additional addressable memory areas coupled to a respective memory controller may also be included in the memory system. The additional memory controllers are also coupled to the memory controller bus in order to receive and pass memory access requests from the other memory controllers. The addressable memory locations may be defined by values stored in registers in the respective memory controller in order for the memory controller to determine whether the requested location is within the memory area to which it is coupled.

DETAILED DESCRIPTION OF THE INVENTION

Embodiments of the present invention provide for a distributed memory controller arrangement that may be substituted for a memory system having a conventional central memory controller arrangement. Multiple memory controllers are arranged such that each memory controller is coupled to at least one addressable memory area which is accessible by the memory controller to which the addressable memory area is coupled. Each memory controller receives direct memory access requests from distinct requesting entities. The multiple memory controllers are coupled together by a memory controller bus, upon which data and indirect memory access requests may be passed from one memory controller to another if the requested address is outside of the addressable memory area to which the memory controller receiving the direct request is coupled.

Certain details are set forth to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

Figure 1:
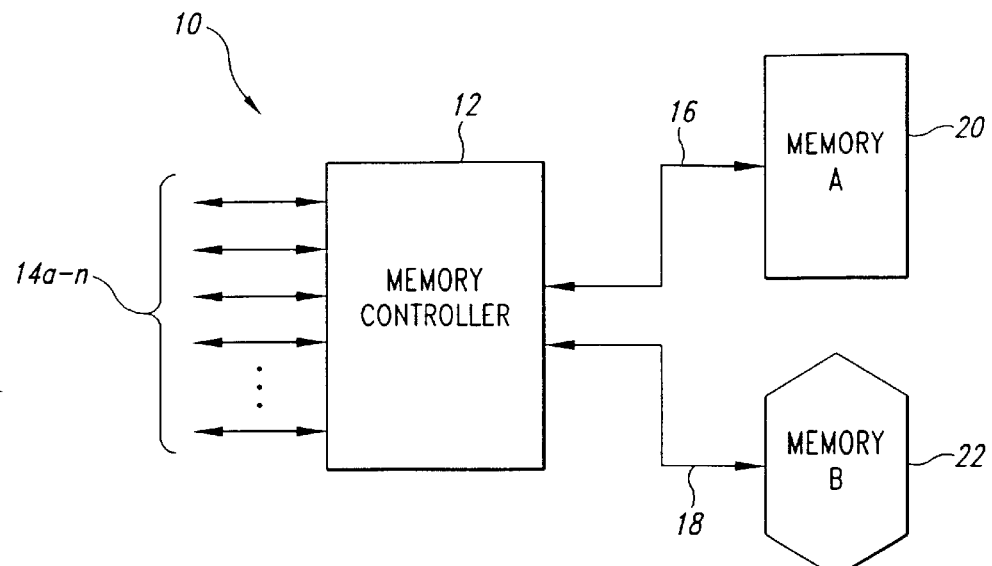
FIG. 1 is a block diagram of a conventional heterogeneous memory system.
Figure 2:
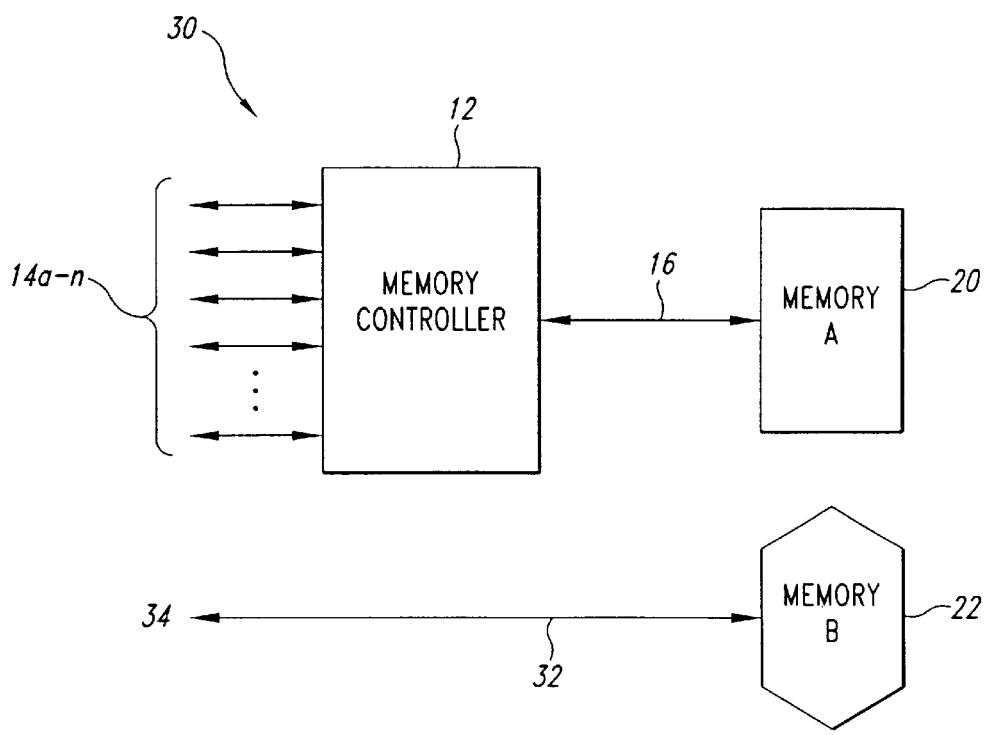
FIG. 2 is a block diagram of an alternative conventional heterogeneous memory system.
Figure 3:
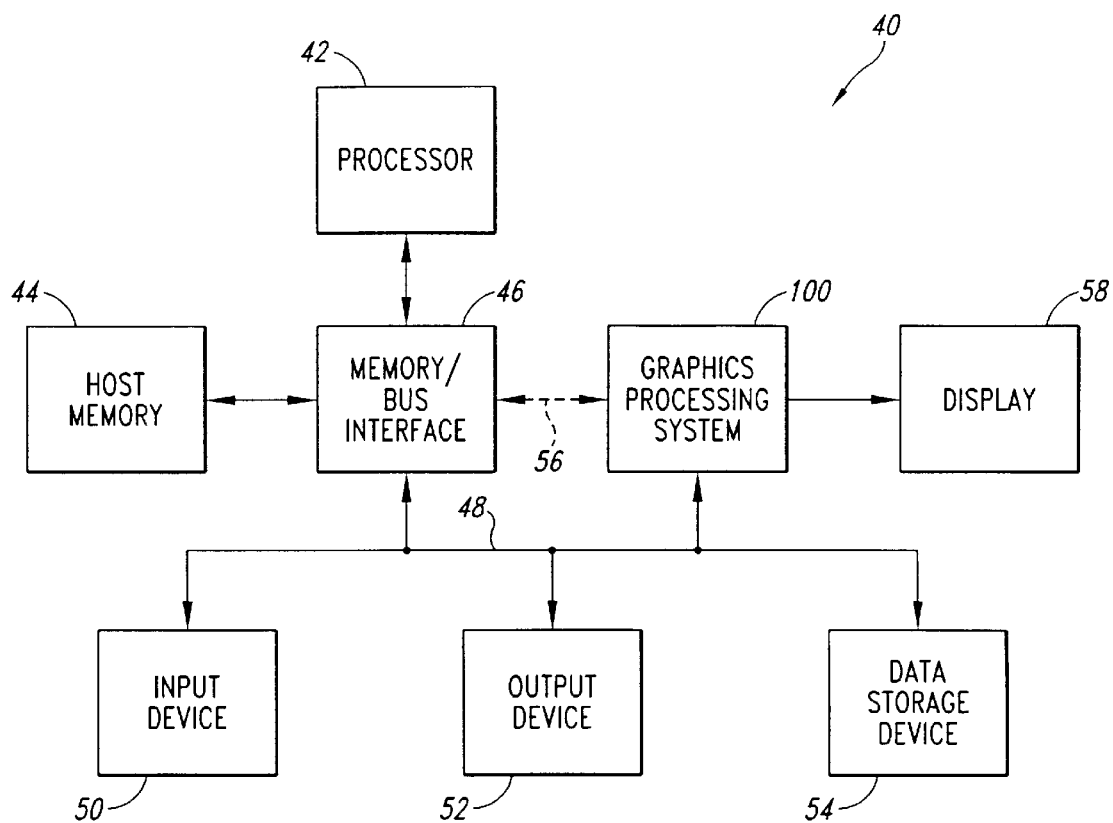
FIG. 3 is a block diagram of a computer system in which embodiments of the present invention are implemented.

FIG. 3 illustrates a computer system 40 in which embodiments of the present invention are implemented. The computer system 40 includes a processor 42 coupled to a host memory 44 through a memory/bus interface 46. The memory/bus interface 46 is coupled to an expansion bus 48, such as an industry standard architecture (ISA) bus or a peripheral component interconnect (PCI) bus. The computer system 40 also includes one or more input devices 50, such as a keypad or a mouse, coupled to the processor 42 through the expansion bus 48 and the memory/bus interface 46. The input devices 50 allow an operator or an electronic device to input data to the computer system 40. One or more output devices 52 are coupled to the processor 42 to provide output data generated by the processor 42. The output devices 52 are coupled to the processor 42 through the expansion bus 48 and memory/bus interface 46. Examples of output devices 52 include printers and a sound card driving audio speakers. One or more data storage devices 54 are coupled to the processor 42 through the memory/bus interface 46 and the expansion bus 48 to store data in, or retrieve data from, storage media (not shown). Examples of storage devices 54 and storage media include fixed disk drives, floppy disk drives, tape cassettes and compact-disc read-only memory rives.

The computer system 40 further includes a graphics processing system 100 coupled to the processor 42 through the expansion bus 48 and memory/bus interface 46. Optionally, the graphics processing system 100 may be coupled to the processor 42 and the host memory 44 through other types of architectures. For example, the graphics processing system 100 may be coupled through the memory/bus interface 46 and a high speed bus 56, such as an accelerated graphics port (AGP), to provide the graphics processing system 100 with direct memory access (DMA) to the host memory 44. That is, the high speed bus 56 and memory bus interface 46 allow the graphics processing system 100 to read from and write to the host memory 44 without the intervention of the processor 42. Thus, data may be. transferred to, and from, the host memory 44 at transfer rates much greater than over the expansion bus 48. A display 58 is coupled to the graphics processing system 100 to display graphics images. The display 58 may be any type of display, such as a cathode ray tube (CRT), a field emission display (FED), a liquid crystal display (LCD), or the like, which are commonly used for desktop computers, portable computers, and workstation or server applications.

FIG. 4 illustrates a memory system 200 according to an embodiment of the present invention. The memory system 200 includes separate memory controllers 202, 222, 242, and 262. Each of the memory controllers 202, 222, 242, and 262 controls and accesses a respective memory 212, 232, 252, and 272 through a memory bus that couples the memory controller to a memory. The memory controllers 202, 222, 242, and 262 are also coupled to each other through a memory controller bus 216. Memory access requests, as well as data, may be transferred through the memory controller bus 216 from one memory controller to another.

Each of the memory controllers 202, 222, 242, and 262 is also coupled to a set of memory access request lines 208a–d on which. the respective memory controller directly receives memory access requests. A memory controller receives direct memory access requests from those requesting entities coupled to its particular request lines. For example, the memory controller 202 will receive direct memory access requests over the memory access request lines 208a. In determining which requesting entities a particular memory controller should receive memory access requests, factors such as physical proximity of the requesting entity to a memory controller, the memory device which a requesting entity is most likely to access, and desired access speed may be considered. As will be discussed in greater detail below, indirect memory access requests can be made by one memory controller to another through the memory controller bus 216 if the requested address is not in the addressable memory area of the memory to which the memory controller receiving the direct memory access request is coupled.

Included in each memory controller 202, 222, 242, and 262 are a respective start address register (SAR) 204a–d and a respective memory size register 206a–d (MSR). With respect to the memory controller 202, the SAR 204a stores the start address of the addressable memory area of the memory 212, and the MSR 206a stores the size or the amount of available addressable memory area of the memory 212. Similarly, the remaining SARs 204b–d and MSRs 206b–d store the respective start addresses and sizes of the addressable memory area for the memory to which the memory controller is coupled. The values stored in the SARs and MSRs of the memory controllers may be programmed by an graphics application executing on the host processor 42 (FIG. 3) or, as will be described later, a graphics processor that is designed to perform graphics functions. The graphics application may update the values stored in the SARs and MSRs during execution in order to reallocate the addressable memory area. By storing the start address and size for the addressable area which each memory controller 202, 222, 242, and 262 controls, a memory controller can determine whether a direct memory access request it receives should be passed to another memory controller if the requested address is not within the range of the memory to which the memory controller receiving the direct memory access request is coupled.

Although the memory system 200 has been described as storing the start address and the amount of available addressable memory area for a memory, it will be appreciated that other values can be used to define the memory as well, such as, the start address and the end address of an addressable memory area. Thus, the particular type of values that are stored by the memory controllers to define the addressable memory area to which it is coupled are details that may be changed, but the resulting memory system will still remain within the scope of the present invention.

The following description of the operation of the memory system 200 is provided merely by way of an example, and should not be interpreted as limiting the scope of the invention. A person of ordinary skill in the art will appreciate that some of the details of the following example, such as the start addresses and size of the addressable memory area, have been selected merely for the purposes of the following example.

In the present example, the values programmed and stored in the SARs and MSRs for the memory controller 202 are 0000 and 1000, for the memory controller 222 are 1000 and 1000, for the memory controller 242 are 2000 and 2000, and for the memory controller 262 are 4000 and 3000. A direct memory access request is received by the memory controller 222 to access memory address 1A00. Based on the values stored in the SAR 204b and MSR 206b, that is, 1000 and 1000, respectively, the memory controller 222 determines that the requested address 1A00 is within the addressable memory area of the memory 232, and services the direct memory access request.

Another direct memory access request is received by the memory controller 222, but this time it is to access memory address 0C00. The memory controller 222 determines that the requested address is not within the addressable memory area of the memory 232 and must make an indirect memory access request to another memory controller in order to service the memory access request. The requested address is less than the 1000 value stored in the SAR 204b, and consequently, the memory controller 222 passes an indirect memory access request to a memory controller having a lower starting memory address through the memory controller bus 216, namely, to the memory controller 202. The memory controller 202 receives the indirect memory access request and determines whether the memory address of the indirect memory access request, namely 0C00, is within the addressable memory area of the memory 212. Based on the values stored in the SAR 204a and the MSR 206a, that is 0000 and 1000, respectively, the memory controller 202 determines that the address 0C00 is within the memory 212, and consequently services the memory access request. If the memory access request is a read command, then the memory controller 202 accesses the requested address, retrieves the data, and passes the data back to the memory controller 222. The memory controller 222 then completes the direct memory access request by providing the data read from the memory 212 by the memory controller 202 to the requesting entity. If the memory access request is a write command, the data is provided to the memory controller 202 along with the requested address through the memory controller bus 216 and is written into the memory 212 by the memory controller 202.

The distributed memory controller arrangement of the memory system 200 addresses the potential problem with physical limitations of the number of memory access request lines that may be routed to a central memory controller by dividing the total number of memory access request lines among different controllers. Thus, the number of memory access request lines to any one memory controller is reduced. Furthermore, the available memory of memories 212, 232, 252, and 272 may be reallocated if desired, and any memory added to the memory system 200 may be utilized in an efficient manner by changing the values stored in the SARs and MSRs of the memory controllers.

Figure 4A:
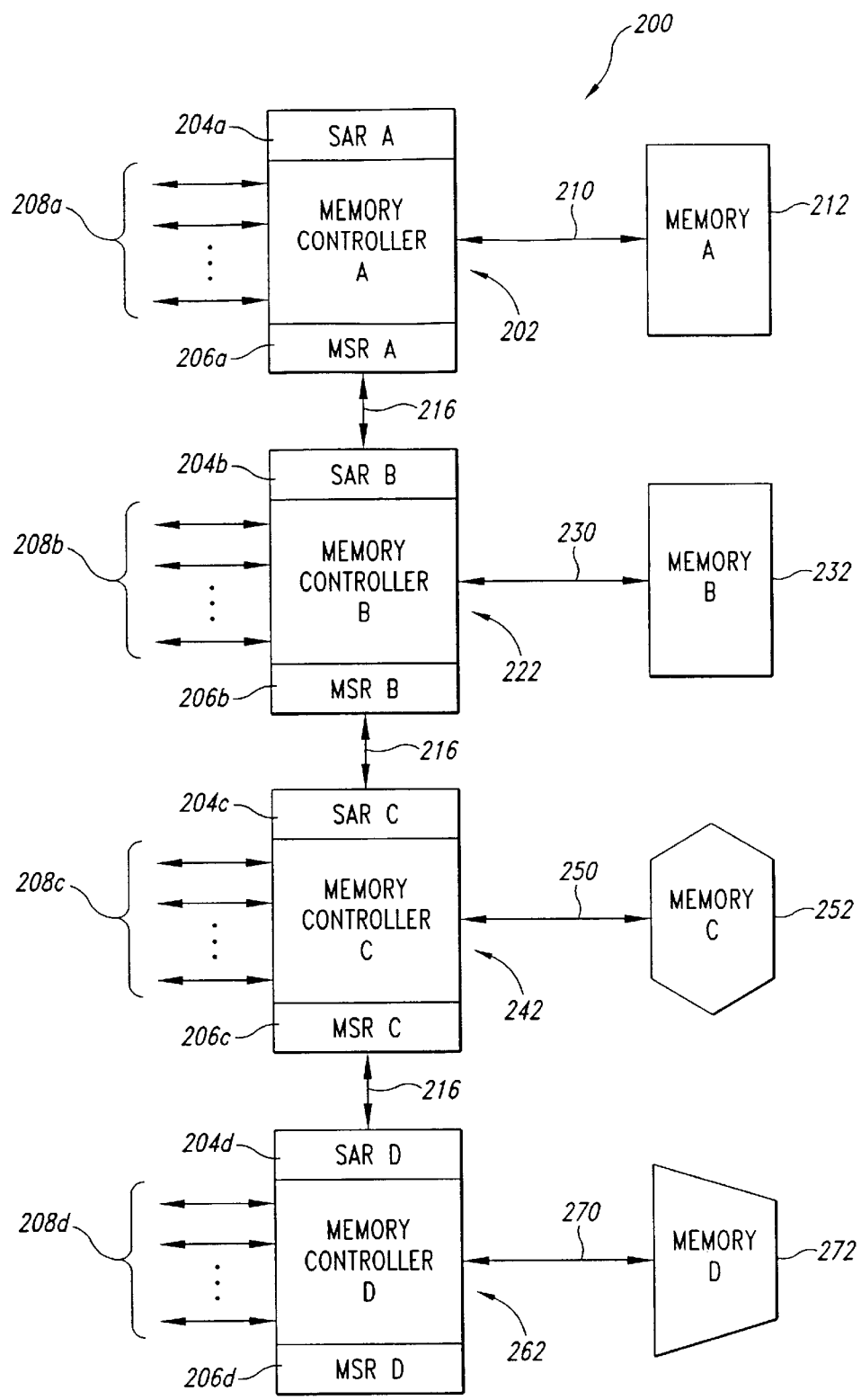
FIG. 4a is a block diagram of a memory system having a distributed memory controller arrangement according to an embodiment of the present invention.
Figure 4B:
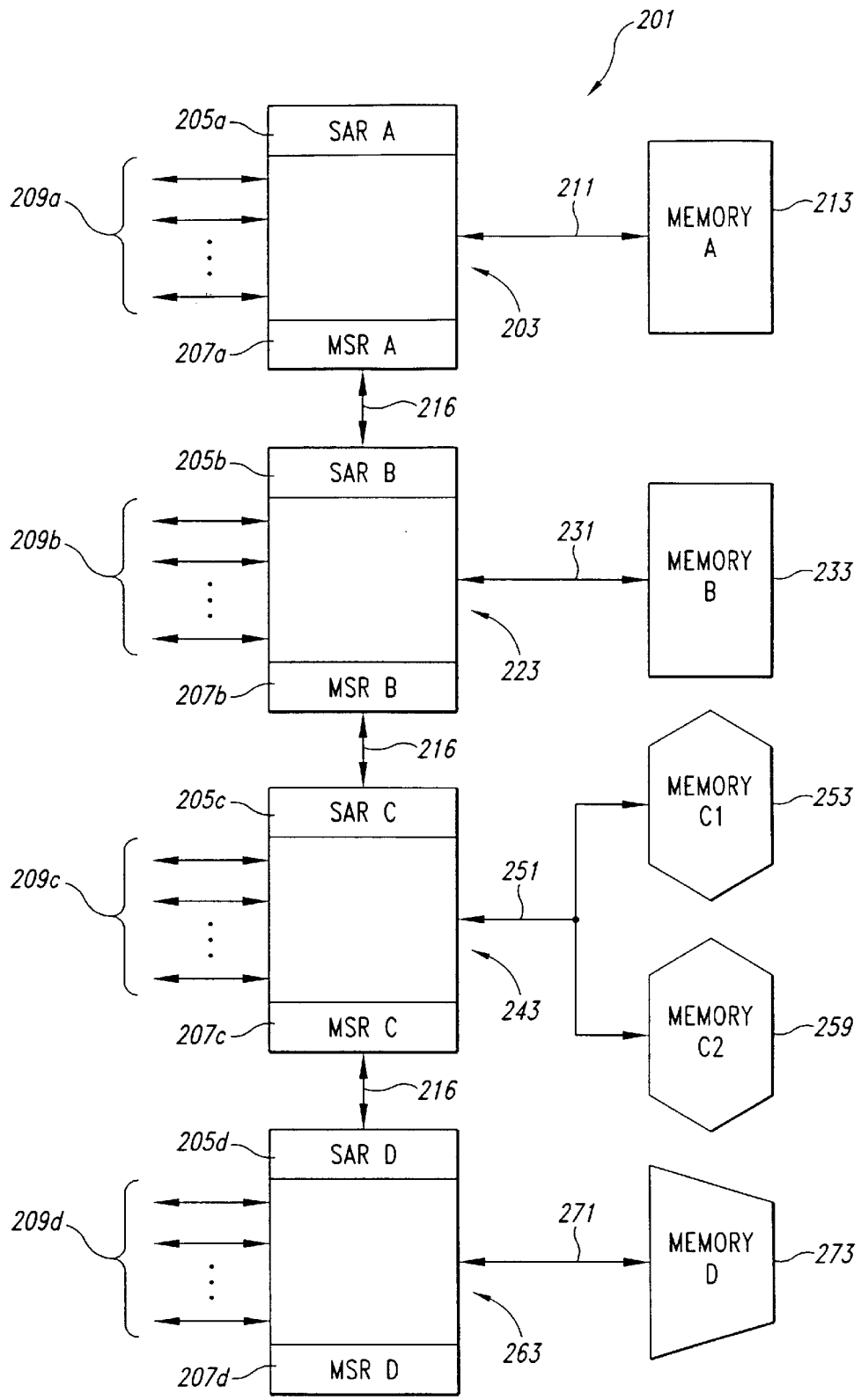
FIG. 4b is a block diagram of a memory system having a distributed memory controller arrangement according to another embodiment of the present invention.

A memory system 201 according to another embodiment of the present invention is shown in FIG. 4b. The memory system 201 is similar to the memory system 200 of FIG. 4a, except that memory controller 243 is coupled to both memories 253 and 259. Although the memory system 200 (FIG. 4a) is arranged such that there is a one-to-one correspondence between memory controllers 202, 222, 242, and 262, and a respective memory 212, 232, 252, and 272, the memory system 201 is arranged such that more than one memory device coupled to a single memory controller. The operation of the memory system 201 is generally the same as for the memory system 200, except that the value stored in the MSR 207c should span the combined size of memories 253 and 259. In this way, the memory controller 243 is able to recognize memory access requests for both the memories 253 and 259.

Figure 5:
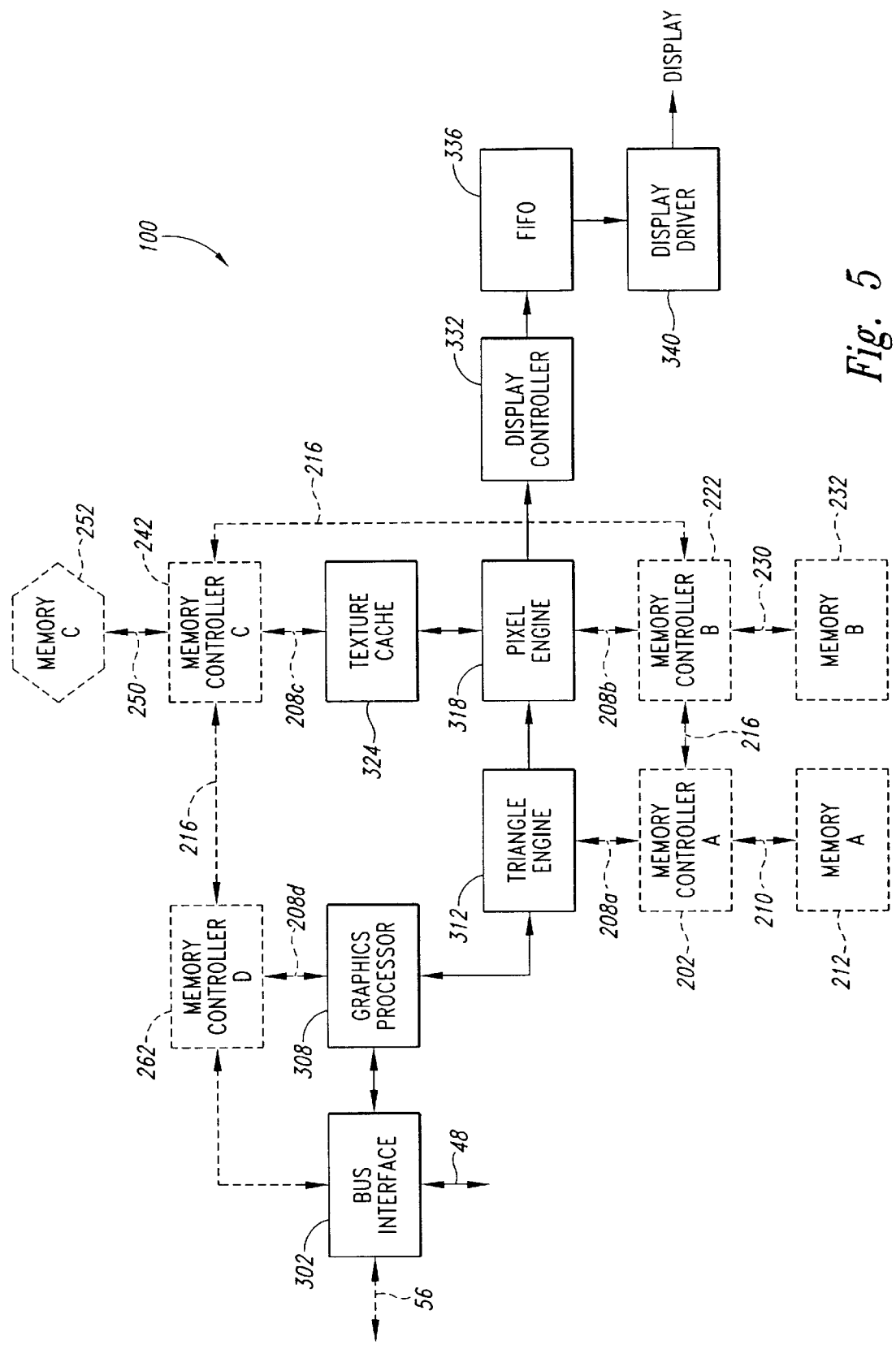
FIG. 5 is a block diagram of a graphics processing system including a distributed memory controller arrangement according to another embodiment of the present invention.

Illustrated in FIG. 5 is another embodiment of the present invention. A memory system similar to the. memory system 200 (FIG. 4a) is used in the context of the graphics processing system 100 (FIG. 3). The graphics processing system 100 includes circuitry for performing various three-dimensional (3D) graphics function. As shown in FIG. 5, a bus interface 302 couples the graphics processing system 100 to the expansion bus 48. In the case where the graphics processing system 100 is coupled to the processor 42 and the host memory 44 through the high speed data bus 56 and the memory/bus interface 46, the bus interface 302 will include a DMA controller (not shown) to coordinate transfer of data to and from the host memory 44 and the processor 42. A graphics processor 308 is coupled to the bus interface 302 and is designed to perform various graphics and video processing functions, such as, but not limited to, generating vertex data and performing vertex transformations for polygon graphics primitives that are used to model 3D objects. In a preferred embodiment, the graphics processor 308 is a reduced instruction set computing (RISC) microprocessor. The graphics processor 308 is coupled to a triangle engine 312 that includes circuitry for performing various graphics functions, such as clipping, attribute transformations, rendering of graphics primitives, and generating texture coordinates from a texture map.

A pixel engine 318 is coupled to receive the graphics data generated by the triangle engine 312. The pixel engine 318 contains circuitry for performing various graphics functions, such as, but not limited to, texture application or mapping, bilinear filtering, fog, blending, and color space conversion. Texture mapping refers to techniques for adding surface detail, or a texture map, to areas or surfaces of polygons used to model the 3D objects. After the texture mapping process, a version of the texture image is visible on surfaces of the polygon with the proper perspective. A typical texture map includes point elements ("texels") which reside in a texture coordinate space is stored in the host memory 44 of the computer system 40. A portion of the texture map that is currently being applied by the pixel engine 318 is stored in a texture cache 324 for quick access during texture processing. A display controller 332 coupled to pixel engine 318 controls the transfer of destination color values from the pixel engine 318 to a FIFO 336. Destination color values stored in the FIFO 336 are provided to a display driver 340 that includes circuitry to provide digital color signals, or convert digital color signals to red, green, and blue analog color signals, to drive the display 58 (FIG. 3).

Also included in the graphics processing system 100 is a distributed memory controller arrangement similar to the memory system 200 of FIG. 4a. That is, instead of a conventional memory system having a central memory controller to service all memory access requests, the graphics processing system 100 uses a memory system where the responsibility of servicing the memory access requests is distributed among multiple memory controllers 202, 222, 242, and 262, coupled to a respective memory 212, 232, 252, and 44 (FIG. 3), and linked together through a memory controller bus 216. The operation of a distributed memory controller arrangement has been previously described with respect to FIG. 4.

Each of the memory controllers receives direct memory access requests from a respective circuit block to access the memory to which the memory controller is coupled. The arrangement of the memory controllers is based in part, as mentioned previously, the proximity of the memory and memory controller to a requesting entity, the desired access time, as well as the type of memory which the requesting entity is likely to access frequently.

In the graphics processing system 100, the memories 212 and 232 may be embedded memory fabricated on the same semiconductor substrate as the graphics processor 308, triangle engine 312, and pixel engine 318. Memory access times for memory access requests made by the triangle engine 312 and the pixel engine 318 will be relatively short because of the proximity of the embedded memories 212 and 232, which will facilitate fast graphics processing. The memory 252 may be implemented by external or local memory, which is, as mentioned previously, memory which is located with the graphics processing system 100, but is not fabricated on the same substrate as the graphics processing circuit blocks. Typically, local memory is implemented using random access memory (RAM), such as dynamic access memory (DRAM), or static random access memory (SRAM), located on the same graphics card as the graphics processor. Although the access time of the memory 252 is greater than for the embedded memories 212 and 232, it is still shorter than for the host memory 44 (FIG. 3). The rate at which texture data is provided to the pixel engine 318 is improved by the presence of the texture cache 324. That is, as mentioned previously, a subset of the texture data presently used for texture application is stored in the texture cache for fast access. The memory controller 262 is coupled to the host memory 44 (FIG. 3). Although the host memory 44 has the longest access time, it does have the benefit of having the greatest available addressable memory area. Graphics data that is not immediately needed by one of the processing blocks, or data that may be needed at a later time, may be stored in the host memory 44.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A memory system for a graphics processing system receiving a direct memory access request on a memory request bus to access memory, the direct memory access request including a memory address corresponding to a location in memory to be accessed, the memory system comprising:

a first addressable memory area defined by a first start address and a first size value to store graphics data;

a first memory controller coupled to the first addressable memory area and having a start address register and a memory size register for storing, respectively, the first start address and the first size value, the first memory controller coupled to a first memory request bus to receive the direct memory access request and adapted to access the first addressable memory area in response to the memory address being located therein and to generate an indirect memory access request including the memory address of the direct memory access request otherwise;

a memory controller bus coupled to the first memory controller structured to transmit the indirect memory access request and to transmit graphics data;

a second addressable memory area defined by a second start address and a second size value to store graphics data; and a second memory controller coupled to a second memory request bus and to the second addressable memory area, the second memory controller having a start address register and a memory size register for storing respectively, the second start address and the second size value, the second memory controller further coupled to the memory controller bus to receive the indirect memory access request from the first memory controller and adapted to access the second addressable memory area in response to the memory address of the indirect memory access request being located therein to service the direct memory access request received by the first memory controller.

2. The memory system of claim 1 wherein the second memory controller is further adapted to generate an indirect memory access request including the memory address in response to the memory address not being located within the second addressable memory area, the memory system, further comprising:

a third addressable memory area defined by a third start address and a third size value to store graphics data; and a third memory controller coupled to a third memory request bus and to the third addressable memory area, the third memory controller having a start address register and a memory size register for storing respectively, the third start address and the third size value, the third memory controller further coupled to the memory controller bus to receive the indirect memory access request from the second memory controller and adapted to access the third addressable memory area in response to the memory address of the indirect memory access request from the second memory controller being located therein to service the direct memory access request received by the first memory controller.

3. The memory system of claim 2 wherein the third memory controller is further adapted to generate an indirect memory access request including the memory address in response to the memory address not being located within the third addressable memory area, the memory system, further comprising:
   a fourth addressable memory area defined by a fourth start address and a fourth size value to store graphics data; and
   a fourth memory controller coupled to a fourth memory request bus and to the fourth addressable memory area, the fourth memory controller having a start address register and a memory size register for storing respectively, the fourth start address and the fourth size value, the fourth memory controller further coupled to the memory controller bus to receive the indirect memory access request from the third memory controller and adapted to access the fourth addressable memory area in response to the memory address of the indirect memory access request from the third memory controller being located therein to service the direct memory access request received by the first memory controller.

4. The memory system of claim 1 wherein at least one of the first and second addressable memory areas comprises an embedded memory array fabricated with the first and second memory controller on a single semiconductor substrate.

5. The memory system of claim 1 wherein at least one of the first and second addressable memory areas comprises a plurality of memory arrays, each memory array contributing memory to the respective addressable memory area.

6. The memory system of claim 1 wherein at least one of the first and second addressable memory areas comprises a memory device having a memory array fabricated on a semiconductor substrate other than the one on which the first and second memory controllers are fabricated.

7. A graphics processing memory subsystem, comprising:
   a first memory having first addressable memory area defined by first and second values;
   a first memory controller coupled to the first memory and a first memory request bus to receive a memory access request to access a memory location, the first memory controller having first and second registers for storing the first and second values, respectively;
   a memory controller bus coupled to the first memory controller, the memory controller bus having a first portion for transferring the memory access request and a second portion for transferring data;
   a second memory having a second addressable memory area defined by third and fourth values; and
   a second memory controller having first and second registers for storing the second the third and fourth values, respectively, the second memory controller coupled to the second memory and a second memory request bus, the second memory controller further coupled to the memory controller bus to receive the memory access request from the first memory controller if the memory location is not in the first addressable memory area.

8. The memory subsystem of claim 7, further comprising:
   a third memory having third addressable memory area defined by fifth and sixth values; and
   a third memory controller coupled to the third memory having first and second registers for storing the fifth and sixth values, respectively, the third memory controller coupled to the third memory and the memory controller bus to receive the memory access request if the memory location is not in the second addressable memory area.

9. The memory subsystem of claim 8, further comprising:
   a fourth memory having fourth addressable memory area defined by seventh and eighth values; and
   a fourth memory controller coupled to the fourth memory having first and second registers for storing the seventh and eighth values, respectively, the fourth memory controller coupled to the fourth memory and the memory controller bus to receive the memory access request if the memory location is not in the third addressable memory area.

10. The memory subsystem of claim 7 wherein at least one of the first and second memories comprises an embedded memory array fabricated with the first and second memory controllers on a single semiconductor substrate.

11. The memory subsystem of claim 7 wherein at least one of the first and second memories comprises a plurality of memory arrays, each memory array contributing memory to the first addressable memory area.

12. The memory subsystem of claim 7 wherein at least one of the first and second memories comprises at least one memory device fabricated on a semiconductor substrate different than the one on which the first and second memories are fabricated.

13. The memory subsystem of claim 7 wherein the first and third values comprise a start address value for the respective memory, and the second and fourth values comprise a memory size value for the respective memory.

14. A distributed memory controller memory system for a graphics processing system, comprising:
   a first addressable memory area;
   a second addressable memory area;
   a first memory controller coupled to the first addressable memory area to access memory locations therein; and
   a second memory controller coupled to the second addressable memory area to access memory locations therein, the second memory controller further coupled to the first memory controller through a first memory controller bus to receive memory access requests from the first memory controller requesting access to memory locations in the second addressable memory area.

15. The memory system of claim 14, further comprising:
   a third addressable memory area; and
   a third memory controller coupled to the third addressable memory area and having access to memory locations therein, the third memory controller further coupled to the second memory controller through a second memory controller bus to receive memory access requests from the second memory controller requesting access to memory locations in the third addressable memory area.

16. The memory system of claim 15, further comprising:
   a fourth addressable memory area; and
   a fourth memory controller coupled to the fourth addressable memory area and having access to memory locations therein, the fourth memory controller further coupled to the third memory controller through a third memory controller bus to receive memory access requests from the third memory controller requesting access to memory locations in the fourth addressable memory area.

17. The memory system of claim 14 wherein the first memory controller includes first and second registers for storing first and second values, respectively, that define the first addressable memory area, and the second memory controller includes first and second registers for storing third and fourth values, respectively, that define the second addressable memory area.

18. The memory system of claim 17 wherein the first and second values are a start address and a memory size value for the first addressable memory area, respectively, and the third and fourth values are a start address and a memory size value for the second addressable memory area, respectively.

19. The memory system of claim 17 wherein the first and second values are a start address and an end address for the first addressable memory area, respectively, and the third and fourth values are a start address and an end address for the second addressable memory area, respectively.

20. The memory system of claim 14 wherein the first addressable memory area comprises a plurality of memory arrays, each memory array contributing a portion of memory to the first addressable memory area.

21. The memory system of claim 14 wherein the first addressable memory area comprises an embedded memory array and the first memory controller and the embedded memory array are fabricated on a single semiconductor substrate.

22. A distributed memory controller memory system for a graphics processing system, comprising:
a first memory and memory controller pair, the memory controller of the first pair having access to the memory of the first pair;
a second memory and memory controller pair, the memory controller of the second pair having access to the memory of the second pair; and
a memory controller bus coupling the memory controller of the first pair to the memory controller of the second pair,
wherein the memory controller of the first pair being structured to pass a memory access request it receives to the memory controller of the second pair over the memory controller bus in response to the memory controller of the first pair determining that the memory access request cannot be completed by it accessing the memory of the first pair.

23. The memory system of claim 22, further comprising a third memory and memory controller pair, the memory controller of the third pair having access to the memory of the third pair and being coupled to the memory controller bus to receive the memory access request from the memory controller of the second pair in response to the memory controller of the second pair determining that the memory access request cannot be completed by it accessing the memory of the second pair.

24. The memory system of claim 23, further comprising a fourth memory and memory controller pair, the memory controller of the fourth pair having access to the memory of the fourth pair and being coupled to the memory controller bus to receive the memory access request from the memory controller of the third pair in response to the memory controller of the third pair determining that the memory access request cannot be completed by it accessing the memory of the third pair.

25. A graphics processing system, comprising:
a bus interface for coupling to a system bus;
a graphics processor coupled to the bus interface to process graphics data;
address and data busses coupled to the graphics processor to transfer address and graphics data to and from the graphics processor;
display logic coupled to the data bus to drive a display;
a memory request bus coupled to the graphics processor to transfer memory access requests; and
a distributed memory controller memory subsystem coupled to the memory request bus to receive and service memory access requests, the memory subsystem comprising:
a first addressable memory area;
a second addressable memory area;
a first memory controller coupled to the memory request bus to receive memory access requests, the first memory controller further coupled to the first addressable memory area and having access to memory locations therein; and
a second memory controller coupled to the second addressable memory area and having access to memory locations therein, the second memory controller further coupled to the first memory controller through a first memory controller bus to receive memory access requests from the first memory controller requesting access to memory locations in the second addressable memory area.

26. The graphics processing system of claim 25 wherein the memory subsystem further comprises:
a third addressable memory area; and
a third memory controller coupled to the third addressable memory area and having access to memory locations therein, the third memory controller further coupled to the second memory controller through a second memory controller bus to receive memory access requests from the second memory controller requesting access to memory locations in the third addressable memory area.

27. The graphics processing system of claim 26 wherein the memory subsystem further comprises:
a fourth addressable memory area; and
a fourth memory controller coupled to the fourth addressable memory area and having access to memory locations therein, the fourth memory controller further coupled to the third memory controller through a third memory controller bus to receive memory access requests from the third memory controller requesting access to memory locations in the fourth addressable memory area.

28. The graphics processing system of claim 25 wherein the first memory controller of the memory subsystem includes first and second registers for storing first and second values, respectively, that define the first addressable memory area, and the second memory controller includes first and second registers for storing third and fourth values, respectively, that define the second addressable memory area.

29. The graphics processing system of claim 28 wherein the first and second values are a start address and a memory size value for the first addressable memory area, respectively, and the third and fourth values are a start address and a memory size value for the second addressable memory area, respectively.

30. The graphics processing system of claim 28 wherein the first and second values are a start address and an end address for the first addressable memory area, respectively, and the third and fourth values are a start address and an end address for the second addressable memory area, respectively.

31. The graphics processing system of claim 25 wherein the first addressable memory area of the memory subsystem comprises a plurality of memory arrays, each memory array contributing a portion of memory to the first addressable memory area.

32. The graphics processing system of claim 25 wherein the first addressable memory area of the memory subsystem comprises an embedded memory array and the first memory controller and the embedded memory array are fabricated on a single semiconductor substrate.

33. A computer system, comprising:
a system processor;
a system bus coupled to the system processor;
a system memory coupled to the system bus; and
a graphics processing system coupled to the system bus, the graphics processing system, comprising:
  a bus interface for coupling to the system bus;
  a graphics processor coupled to the bus interface to process graphics data;
  address and data busses coupled to the graphics processor to transfer address and graphics data to and from the graphics processor;
  display logic coupled to the data bus to drive a display;
  a memory request bus coupled to the graphics processor to transfer memory access requests; and
  a distributed memory controller memory subsystem coupled to the memory request bus to receive and service memory access requests, the memory subsystem comprising:
    a first addressable memory area;
    a second addressable memory area;
    a first memory controller coupled to the memory request bus to receive memory access requests, the first memory controller further coupled to the first addressable memory area and having access to memory locations therein; and
    a second memory controller coupled to the second addressable memory area and having access to memory locations therein, the second memory controller further coupled to the first memory controller through a first memory controller bus to receive memory access requests from the first memory controller requesting access to memory locations in the second addressable memory area.

34. The computer system of claim 33 wherein the memory subsystem further comprises:
a third addressable memory area; and
a third memory controller coupled to the third addressable memory area and having access to memory locations therein, the third memory controller further coupled to the second memory controller through a second memory controller bus to receive memory access requests from the second memory controller requesting access to memory locations in the third addressable memory area.

35. The computer system of claim 34 wherein the memory subsystem further comprises:
a fourth addressable memory area; and
a fourth memory controller coupled to the fourth addressable memory area and having access to memory locations therein, the fourth memory controller further coupled to the third memory controller through a third memory controller bus to receive memory access requests from the third memory controller requesting access to memory locations in the fourth addressable memory area.

36. The computer system of claim 33 wherein the first memory controller of the memory subsystem includes first and second registers for storing first and second values, respectively, that define the first addressable memory area, and the second memory controller includes first and second registers for storing third and fourth values, respectively, that define the second addressable memory area.

37. The computer system of claim 36 wherein the first and second values are a start address and a memory size value for the first addressable memory area, respectively, and the third and fourth values are a start address and a memory size value for the second addressable memory area, respectively.

38. The computer system of claim 36 wherein the first and second values are a start address and an end address for the first addressable memory area, respectively, and the third and fourth values are a start address and an end address for the second addressable memory area, respectively.

39. The computer system of claim 33 wherein the first addressable memory area of the memory subsystem comprises a plurality of memory arrays, each memory array contributing a portion of memory to the first addressable memory area.

40. The computer system of claim 33 wherein the first addressable memory area of the memory subsystem comprises an embedded memory array and the first memory controller and the embedded memory array are fabricated on a single semiconductor substrate.

41. The computer system of claim 33 wherein at least one of the first and second addressable memory areas of the memory subsystem is the system memory.

42. A method of accessing a memory location having a memory address in graphics processing system, comprising:
receiving at a first memory controller a memory access request to access the memory location;
determining whether the memory address of the memory location is within a first addressable memory area to which the first memory controller is coupled;
passing the memory access request to another memory controller to service the memory access request when the memory address is not within the addressable memory area which the first memory controller can access; and
accessing the memory location through a memory controller coupled to an addressable memory area containing the memory location.

43. The method of claim 42, further comprising:
if the memory access request is a read command, reading data from the memory location and returning the data to the first memory controller to complete the memory access request; and
if the memory access request is a write command, including write data with the memory access request and writing the write data to the memory location through the memory controller coupled to the addressable memory area containing the memory location.

44. The method of claim 42, further comprising storing in each memory controller first and second values defining the addressable memory area to which the respective memory controller is coupled.

45. The method of claim 44 wherein determining whether the memory address is within the first addressable memory area comprises comparing the memory address to the first and second values stored in the first memory controller.

46. The method of claim 44 wherein the first and second values are a start address and memory size value, respectively, for the respective addressable memory area.

47. The method of claim 44 wherein the first and second values are a start address and end address, respectively, for the respective addressable memory area.

48. In a graphics processing system, a method of accessing a memory location having a memory address, comprising:

receiving at a memory controller a memory access request to access the memory location;

comparing the memory address to first and second values that define an addressable memory area to which the memory controller can access;

forwarding the memory access request to another memory controller when the memory location is not located in the addressable memory area accessible to the receiving memory controller;

repeating the steps of receiving, comparing, and forwarding until a target memory controller identifies that the memory location is located within the addressable memory area to which the target memory controller is coupled; and accessing the memory location through the target memory controller.

49. The method of claim 48, further comprising:

if the memory access request is a read command, reading through the target memory controller data from the memory location and returning the data to the memory controller that first received the memory access request; and if the memory access request is a write command, including write data with the memory access request and writing the write data to the memory location through the target memory controller.

50. The method of claim 48, further comprising storing in each memory controller the first and second values for the addressable memory area to which the respective memory controller is coupled.

51. The method of claim 48 wherein the first and second values are a start address and memory size value, respectively, for the respective addressable memory area.

52. The method of claim 48 wherein the first and second values are a start address and end address, respectively, for the respective addressable memory area.

* * * * *

UNITED STATES PATENT AND TRADEMARK OFFICE
CERTIFICATE OF CORRECTION

PATENT NO. : 6,791,555 B1
DATED : September 14, 2004
INVENTOR(S) : Radke et al.

It is certified that error appears in the above-identified patent and that said Letters Patent is hereby corrected as shown below:

Title page,
Item [*] Notice, delete the phrase "by 538 days" and insert -- by 581 days --

Signed and Sealed this

Twenty-fifth Day of January, 2005

JON W. DUDAS
*Director of the United States Patent and Trademark Office*

UNITED STATES PATENT AND TRADEMARK OFFICE
CERTIFICATE OF CORRECTION

PATENT NO.         : 6,791,555 B1
APPLICATION NO. : 09/603158
DATED                  : September 14, 2004
INVENTOR(S)       : William Radke and James R. Peterson It is certified that error appears in the above-identified patent and that said Letters Patent is hereby corrected as shown below:

| Column, Line | Reads | Should Read |
|---|---|---|
| Item (56), U.S. Patent Documents | "6,252,512 B1 * 6/2001 Jaddeloh" | --6,252,612 B1 * 6/2001 Jeddeloh-- |
| Column 1, Line 15 | "of an computer" | --of a computer-- |
| Column 1, Line 28 | "as external, or" | --as external or-- |
| Column 2, Line 24 | "with regards to" | --with regard to-- |
| Column 3, Line 63 | "operator or an electronic" | --operator of an electronic-- |
| Column 4, Line 9 | "rives." | --drives.-- |
| Column 4, Line 46 | "on which. the respective" | --on which the respective-- |
| Column 4, Line 52 | "determining which" | --determining from which-- |
| Column 5, Line 8 | "by an graphics" | --by a graphics-- |
| Column 6, Line 36 | "device coupled" | --device is coupled-- |
| Column 6, Line 48 | "graphics function." | --graphic functions.-- |
| Column 7, Line 12 | "space is stored" | --space stored-- |
| Column 7, Line 40 | "previously, the proximity" | --previously, on the proximity-- |
| Column 8, Lines 43 and 64 | "register for storing" | --register for storing,-- |
| Column 8, Line 57 | "the memory system, fur-" | --the memory system fur- -- |
| Column 9, Line 12 | "the memory system, further" | --the memory system further-- |
| Column 9, Line 20 | "for storing" | --for storing,-- |

UNITED STATES PATENT AND TRADEMARK OFFICE
CERTIFICATE OF CORRECTION

PATENT NO. : 6,791,555 B1
APPLICATION NO. : 09/603158
DATED : September 14, 2004
INVENTOR(S) : William Radke and James R. Peterson It is certified that error appears in the above-identified patent and that said Letters Patent is hereby corrected as shown below:

| | | |
|---|---|---|
| Column 9, Line 45 | "having first addressable" | --having a first addressable-- |
| Column 9, Line 60 | "the second the third and fourth" | --the third and fourth-- |
| Column 10, Line 2 | "having third addressable" | --having a third addressable-- |
| Column 10, Line 13 | "having fourth addressable" | --having a fourth addressable-- |
| Column 13, Line 22 | "processing system, comprising:" | --processing system comprising:-- |
| Column 14, Line 37 | "address in graphics" | --address in a graphics-- |

Signed and Sealed this

Fourth Day of September, 2007

JON W. DUDAS
*Director of the United States Patent and Trademark Office*